US007419313B2

(12) United States Patent
Jablonski et al.

(10) Patent No.: US 7,419,313 B2
(45) Date of Patent: Sep. 2, 2008

(54) OPTOELECTRONIC DEVICE IN COMBINATION WITH A PUSH-IN CAGE

(75) Inventors: John Jablonski, Chicago, IL (US); Anthony S. Kowalkowski, Chicago, IL (US); Bruce Peterson, Schaumberg, IL (US)

(73) Assignee: Stratos International, Inc., Chicago, IL (US)

(*) Notice: Subject to any disclaimer, the term of this patent is extended or adjusted under 35 U.S.C. 154(b) by 0 days.

(21) Appl. No.: 11/654,434

(22) Filed: Jan. 16, 2007

(65) Prior Publication Data

US 2008/0170375 A1 Jul. 17, 2008

(51) Int. Cl.
*G02B 6/36* (2006.01)

(52) U.S. Cl. ........................................................ 385/92

(58) Field of Classification Search ....................... None
See application file for complete search history.

(56) References Cited

U.S. PATENT DOCUMENTS

| | | | | |
|---|---|---|---|---|
| 4,111,514 | A * | 9/1978 | Brishka et al. | 439/680 |
| 4,753,511 | A * | 6/1988 | Bowers et al. | 385/140 |
| 5,274,729 | A * | 12/1993 | King et al. | 385/134 |
| 5,481,634 | A | 1/1996 | Anderson et al. | 385/76 |
| 5,717,533 | A | 2/1998 | Poplawski et al. | 361/752 |
| 5,734,558 | A | 3/1998 | Poplawski et al. | 361/752 |
| 5,812,582 | A | 9/1998 | Gilliland et al. | 372/50 |
| 5,812,717 | A | 9/1998 | Gilliland | 385/93 |
| 5,864,468 | A | 1/1999 | Poplawski et al. | 361/753 |
| 5,879,173 | A | 3/1999 | Poplawski et al. | 438/138 |
| RE36,491 | E | 1/2000 | Gilliland et al. | 372/38 |
| RE36,820 | E | 8/2000 | McGinley et al. | 361/752 |
| 6,108,114 | A | 8/2000 | Gilliland et al. | 359/187 |
| 6,160,647 | A | 12/2000 | Gilliland et al. | 359/110 |
| 6,179,627 | B1 | 1/2001 | Daly et al. | 439/76.1 |
| 6,358,066 | B1 | 3/2002 | Gilliland et al. | 439/76.1 |
| 6,430,053 | B1 | 8/2002 | Peterson et al. | 361/728 |
| 6,533,470 | B2 * | 3/2003 | Ahrens | 385/88 |
| 6,551,117 | B2 | 4/2003 | Poplawski et al. | 439/92 |
| 6,556,445 | B2 | 4/2003 | Medina | 361/728 |
| 6,570,768 | B2 | 5/2003 | Medina | 361/747 |
| 6,607,307 | B2 | 8/2003 | Gilliland et al. | 385/88 |
| 6,711,189 | B1 | 3/2004 | Gilliland et al. | 372/38.02 |
| 6,778,399 | B2 | 8/2004 | Medina et al. | 361/729 |
| 6,913,402 | B2 | 7/2005 | Bohlin et al. | 385/93 |
| 2006/0039123 | A1 * | 2/2006 | Malagrino et al. | 361/727 |
| 2007/0036489 | A1 * | 2/2007 | Grzgorzewska et al. | 385/88 |

OTHER PUBLICATIONS

Small Form-Factor Pluggable (SFP) Transceiver Multisource Agreement (MSA), dated Sep. 14, 2000.

* cited by examiner

*Primary Examiner*—Sung Pak
*Assistant Examiner*—Mike Stahl
(74) *Attorney, Agent, or Firm*—Karl D. Kovach

(57) ABSTRACT

The device includes a push-in cage, and an optoelectronic device. The push-in cage includes a first thread form, and a first key. The optoelectronic device includes an optical subassembly, a second thread form, and a second key. The second thread form of the optoelectronic device is complementary to the first thread form of the push-in cage, and the second key of the optoelectronic device is complementary to the first key of the push-in cage.

22 Claims, 8 Drawing Sheets

OPTOELECTRONIC DEVICE IN COMBINATION WITH A PUSH-IN CAGE

BACKGROUND OF THE INVENTION

1. Field of the Invention

The present invention pertains to optoelectronic devices. The invention more particularly concerns an optoelectronic device which mates with a cage where the cage is push-in mountable to a bezel or faceplate of a host structure.

2. Discussion of the Background

An optoelectronic device utilizes at least one optical subassembly. The optical subassembly can be an optoelectronic receiver or an optoelectronic transmitter. An optoelectronic transmitter receives electrical signals, converts the electrical signals to light signals, and then transmits the light signals. An optoelectronic receiver receives light signals, converts the light signals to electrical signals, and then transmits the electrical signals. A transceiver is an optoelectronic device which has at least one optoelectronic receiver and at least one optoelectronic transmitter.

Optoelectronic devices can be used in many ways. Some optoelectronic devices are surface mountable. Such an optoelectronic device is disclosed in U.S. Pat. No. 6,358,066. Some optoelectronic devices are pluggable. Such optoelectronic devices are disclosed in U.S. Pat. Nos. 5,717,533; 5,734,558; 5,864,468; 5,879,173; 6,570,768; and Re 36,820. And yet other optoelectronic devices are bulkhead mountable. Such an optoelectronic device is disclosed in U.S. Pat. No. 6,913,402. Electronics associated with some types of optoelectronic devices are disclosed in U.S. Pat. Nos. 5,812,582; 5,812,717; 6,108,114; 6,160,647; 6,607,307; 6,711,189; and Re 36,491.

One pluggable optoelectronic device is known as the Small Form-Factor Pluggable (SFP) transceiver. The SFP transceiver is a form factor that is defined by a standard known as the "Small Form-Factor Pluggable (SFP) Transceiver Multisource Agreement (MSA)," dated Sep. 14, 2000. Such optoelectronic devices are disclosed in U.S. Pat. Nos. 6,430,053; 6,556,445; 6,570,768; and 6,778,399. The SFP transceiver requires less space on the circuit board of a host device or host structure as compared to then previously known transceivers such as the Giga-Bit Interface Converter (GBIC) transceiver. A Giga-Bit Interface Converter is disclosed in U.S. Pat. No. 6,179,627. U.S. Pat. Nos. 5,717,533; 5,734,558; 5,812,582; 5,812,717; 5,864,468; 5,879,173; 6,108,114; 6,160,647; 6,179,627; 6,358,066; 6,430,053; 6,556,445; 6,570,768; 6,607,307; 6,711,189; 6,778,399; 6,913,402; Re 36,491; and Re 36,820 are hereby incorporated herein by reference.

Each SFP transceiver is plugged into a cage or receptacle of the host structure. The cage is mounted to a circuit board of the host structure. The cage is designed to limit the propagation of electromagnetic radiation. The cage occupies space on the circuit board of the host structure. Also, when the cage is mounted to the circuit board of the host structure, errors, mistakes, or accidents can cause the act of attaching the cage to the circuit board to ruin or cause the circuit board to be reworked.

Accordingly, there is a need for an optoelectronic device which does not utilize much of the area of a circuit board of the host structure, is easily insertable into and removable from a host structure by an operator, and does not require much work on the circuit board of the host structure so as to make the host device functional with the optoelectronic device.

SUMMARY OF THE INVENTION

It is an object of the invention to provide a device which is easily mateable with a host structure.

It is another object of the invention to provide a device which minimizes the amount of area that is occupied on the circuit board of the host structure by the device.

It is still further an object of the invention to provide a device which minimizes the amount of electro-magnetic radiation emanating from the host structure.

It is yet still further an object of the invention to provide a device which requires less work on the circuit board of the host structure so as to become functionally engaged with the host structure.

In one form of the invention the device includes a push-in cage, and an optoelectronic device. The push-in cage includes a first thread form, and a first key. The optoelectronic device includes an optical subassembly, electrical signal conditioning components electrically associated with the optical subassembly, a second thread form, and a second key. The second thread form of the optoelectronic device is complementary to the first thread form of the push-in cage. The second key of the optoelectronic device is complementary to the first key of the push-in cage.

In another form of the invention the device is mateable with a host structure, where the host structure includes a faceplate, an electrical connector, and a key. The device includes a push-in cage, a circuit board, an optical subassembly, an optical connector, an electrical connector, a housing, and a nut. The push-in cage includes a first thread form, a first key, and a second key. The push-in cage is adapted for attachment to the faceplate of the host structure, and the first key of the push-in cage is complementary to the key of the host structure. The optical subassembly is electrically associated with the circuit board. The optical connector includes a receptacle for receiving a fiber optic connector. The optical subassembly is in optical communication with the receptacle. The electrical connector is on the circuit board. The housing is mounted to the optical connector. The housing includes a third key. The third key of the housing is complementary to the second key of the push-in cage. The nut is retained between the housing and the optical connector. The nut includes a second thread form. The nut is free to rotate relative to the housing and the optical connector. The second thread form of the nut is complementary to the first thread form of the push-in cage. When the push-in cage is mounted to the faceplate of the host structure, the key of the host structure engages the first key of the push-in cage so as to prevent the push-in cage from rotating relative to the faceplate of the host structure. When the second thread form of the nut is engaged with the first thread form of the push-in cage, the third key of the housing engages the second key of the push-in cage so as to prevent the housing from rotating relative to the push-in cage. When the nut is rotated relative to the push-in cage, the nut translates closer to the faceplate of the host structure so as to cause the optical connector, circuit board, and housing to translate by substantially the same amount. Upon further rotation of the nut relative to the push-in cage, the electrical connector on the circuit board electrically engages the electrical connector of the host structure.

In yet another form of the invention the device is mateable with a host structure, where the host structure includes a faceplate, an electrical connector, and a key. The device includes a push-in cage, a circuit board, a first optical subassembly, a second optical subassembly, an optical connector, an electrical connector, a housing, and a nut. The push-in cage includes a first thread form, a first key, and a second key. The push-in cage is adapted for attachment to the faceplate of the host structure, and the first key of the push-in cage is complementary to the key of the host structure. The circuit board includes electrical signal conditioning components. The first optical subassembly is electrically associated with the circuit board. The second optical subassembly is electrically associated with the circuit board. The optical connector includes a first receptacle for receiving a first fiber optic connector, and a second receptacle for receiving a second fiber optic connector. The first optical subassembly is in optical communication with the first receptacle. The second optical subassembly is in optical communication with the second receptacle. The electrical connector is on the circuit board. The housing is mounted to the optical connector. The housing includes a third key. The third key of the housing is complementary to the second key of the push-in cage. The nut is retained between the housing and the optical connector. The nut includes a second thread form. The nut is free to rotate relative to the housing and the optical connector. The second thread form of the nut is complementary to the first thread form of the push-in cage.

In still yet another form of the invention the device is mateable with a host structure, where the host structure includes a faceplate, an electrical connector, and a key. The device includes a push-in cage, and an optoelectronic device. The push-in cage includes a first key, and a second key. The push-in cage is adapted for attachment to only the faceplate of the host structure, and the first key of the push-in cage is complementary to the key of the host structure.The optoelectronic device includes an optical subassembly, electrical signal conditioning components electrically associated with the optical subassembly, and a third key. The third key of the optoelectronic device is complementary to the second key of the push-in cage.

In yet still another form of the invention the device is mateable with a host structure, where the host structure includes a faceplate, an electrical connector, and a key. The device includes a push-in cage, and an electronic device. The push-in cage includes a first thread form, a first key, and a second key. The push-in cage is adapted for attachment to the faceplate of the host structure, and the first key of the push-in cage is complementary to the key of the host structure. The electronic device includes a second thread form, and a third key. The third key of the optoelectronic device is complementary to the second key of the push-in cage. The second thread form of the electronic device is complementary to the first thread form of the push-in cage.

Thus, the invention achieves the objectives set forth above. The invention provides a device which is able to be easily mated to a host structure, does not take up as much area on a circuit board of a host structure as compared to other optoelectronic devices, does not require a cage mounted to the circuit board of the host structure, and which does not require as much work to be performed on the circuit board of the host structure so as to enable the host structure to interact with the device.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PRESENTLY PREFERRED EMBODIMENT

Figure 1:
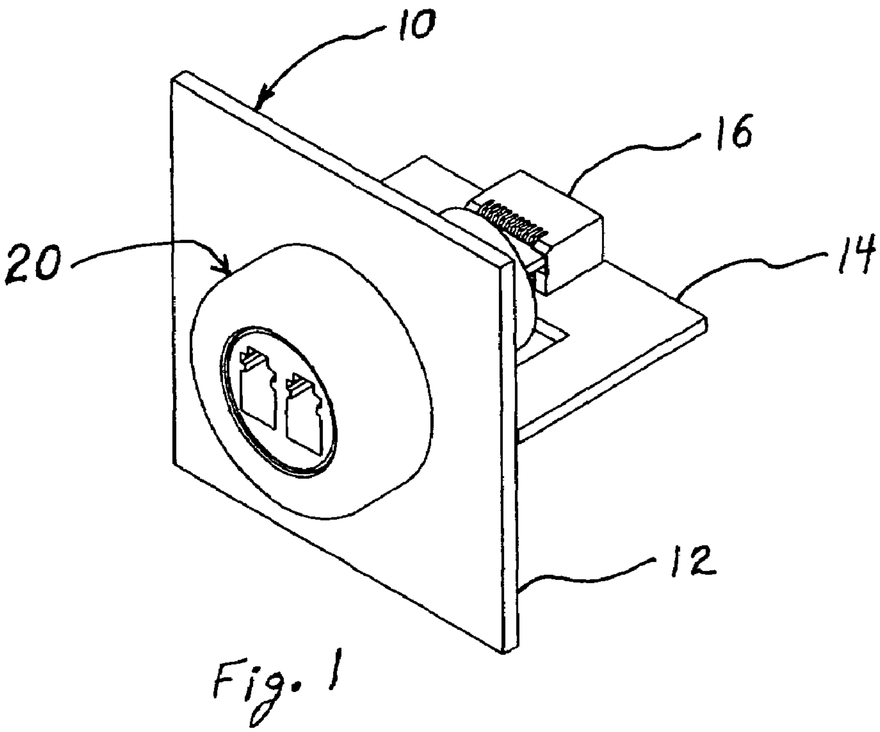
FIG. 1 is a perspective view of a device of the invention mated or connected to a portion of a host structure or device, an optoelectronic device of the device of the invention is shown but not the push-in cage.

Referring now to the drawings, wherein like reference numerals designate identical or corresponding parts throughout the several views, and more particularly to FIGS. 1-20 thereof, an embodiment of the present invention is displayed therein.

FIG. 1 is a perspective view of an embodiment of a device 20 mated to a portion of a host structure 10. The portion of the host structure 10 includes a bezel or faceplate 12, a circuit board 14, and an electrical connector 16 attached to the circuit board 14. The device 20 includes an optoelectronic device 70 and a push-in cage 30 (see FIG. 3).

Figure 2:
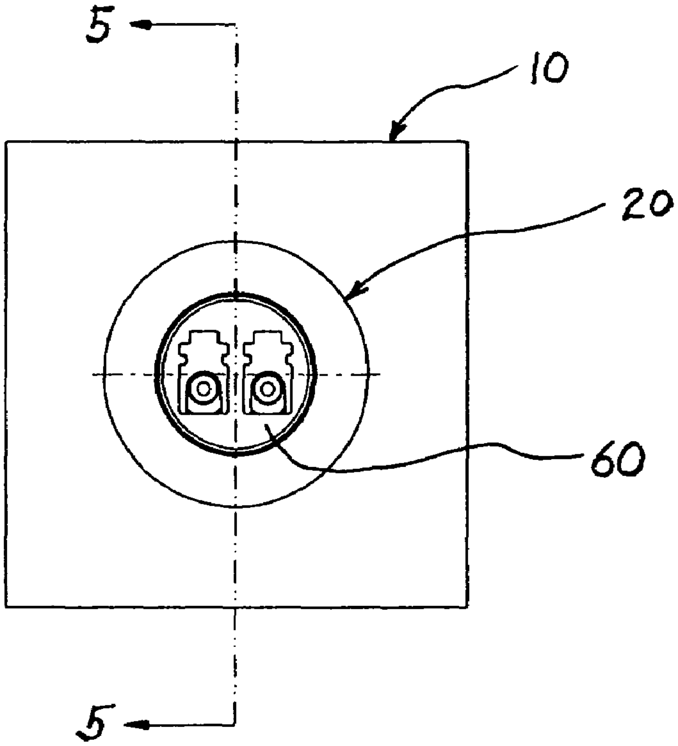
FIG. 2 is a front view of the device of FIG. 1 mated or engaged with the host structure.

FIG. 2 is a front view of the device 20 mated to the host structure 10 of FIG. 1. An optical connector 60 of the device 20 is disclosed. As shown, the optical connector 60 includes two optical ports.

Figure 3:
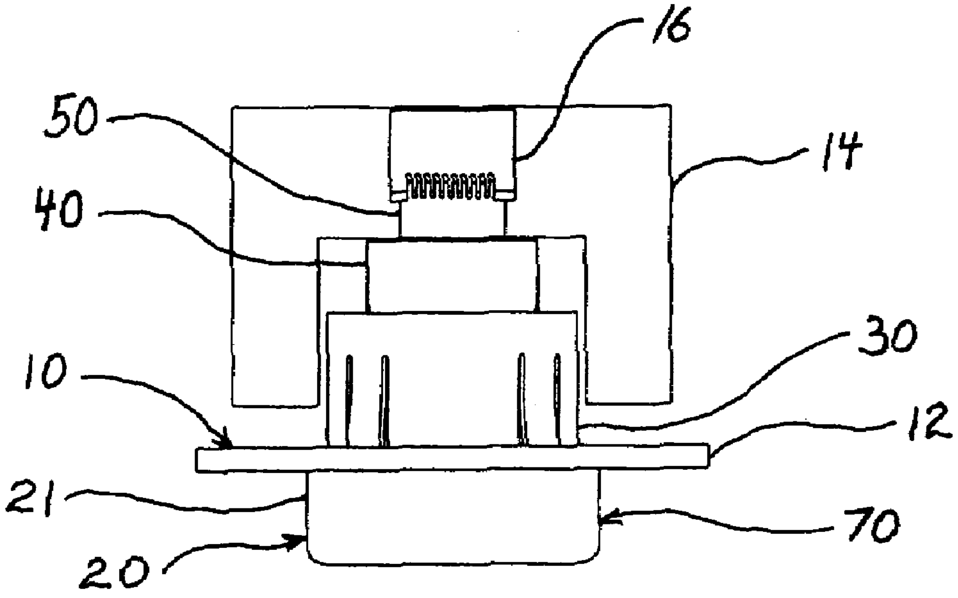
FIG. 3 is a top view of the device of FIG. 2 which shows the push-in cage.
Figure 4:
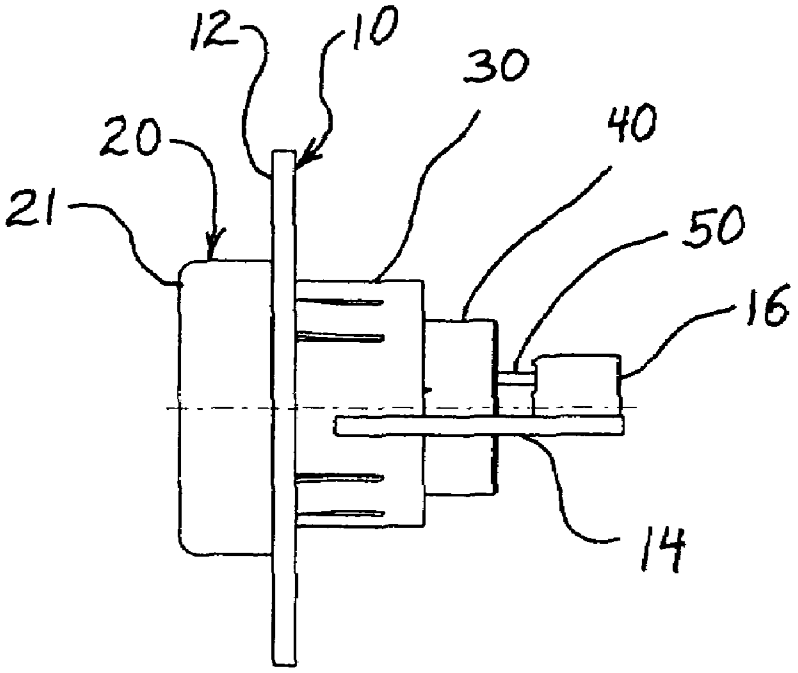
FIG. 4 is a side view of the device of FIG. 2.

FIG. 3 is a top view of the device 20 mated to the host structure 10. FIG. 4 is a side view of the device 20 mated to or engaged with the host structure 10. The faceplate 12, the circuit board 14, and the electrical connector 16 of the host structure 10 are shown. The optoelectronic device 70 and the push-in cage 30 form the device 20. A nut 21, a housing 40, and a circuit board 50 of the optoelectronic device 70 are shown.

Figure 5:
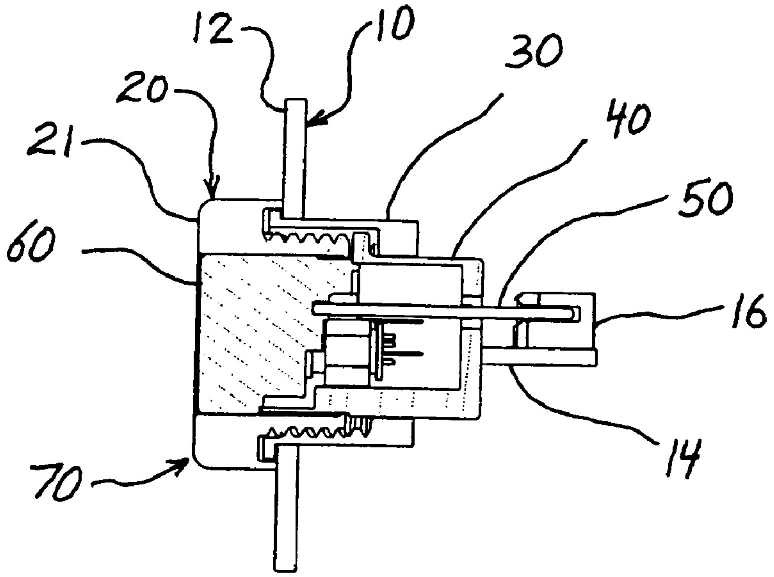
FIG. 5 is a cross-sectional side view of the device taken along section line 5-5 of FIG. 2.

FIG. 5 is a cross-sectional side view of the device 20 mated to the host structure 10 taken along section line 5-5 of FIG. 2. The optoelectronic device 70 is shown in combination with the push-in cage 30 so as to form the device 20. However, in practice, the push-in cage 30 is attached to the host structure 10, and after that step the optoelectronic device 70 is attached to the push-in cage 30 thus forming the device 20 (i.e., the combination of the optoelectronic device 70 and the push-in cage 30). The device 20 is mated with the host structure 10. The nut 21, the optical connector 60, the housing 40, and the circuit board 50 of the optoelectronic device 70 are shown. An electrical connector portion formed on the circuit board 50 of the optoelectronic device 70 is shown engaged with the electrical connector 16 of the host structure 10. The push-in cage 30 of the device 20 is shown in contact with the faceplate 12 of the host structure 10. A part of the nut 21 of the optoelectronic device 70 of the device 20 is shown in contact with the faceplate 12 of the host structure 10.

Figure 6:
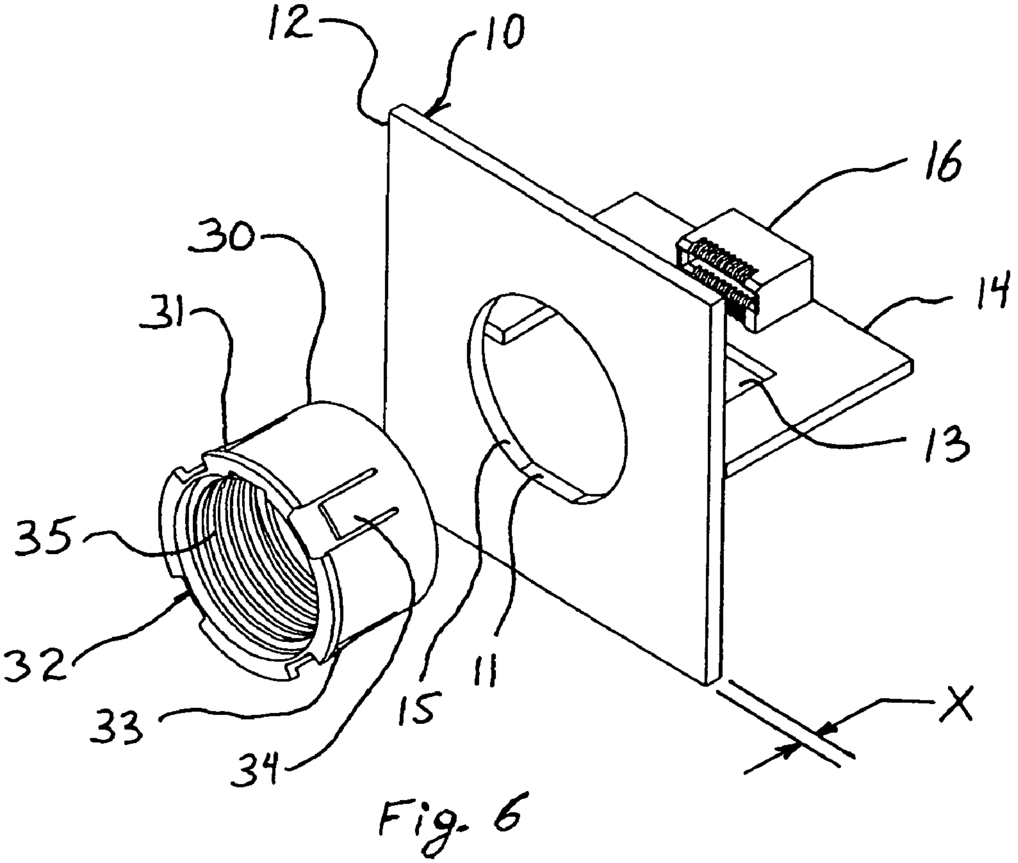
FIG. 6 is an exploded, perspective view of the push-in cage and the portion of the host structure of FIG. 1.

FIG. 6 is an exploded, perspective view of the push-in cage 30 and the portion of the host structure 10. The circuit board 14 includes a cut-out 13. The faceplate 12 includes an aperture 15 and a key 11. The push-in cage 30 of the device 20 includes a first flexible tab 31, a second flexible tab 32, a third flexible tab 33, a fourth flexible tab 34, and a thread form 35. The shape of the push-in cage 30 is complementary to the shape of the aperture 15 of the faceplate 12. The faceplate 12 has a width dimension which is denoted by the alphabetic character X.

When the push-in cage 30 is mounted to the faceplate 12, the push-in cage 30 is pushed into the aperture 15 of the faceplate 12 until the flexible tabs 31, 32, 33, 34 have deflected towards one another and then they expand back to their un-deflected position once the flexible tabs 31, 32, 33, 34 have passed by the width of the faceplate 12 so as to retain the push-in cage 30 with the faceplate 12. In the un-deflected position, the ends of the flexible tabs 31, 32, 33, 34 extend beyond the perimeter of the aperture 15. Additionally, a key 37 (see FIG. 18) of the push-in cage 30 must be aligned with the key 11 of the faceplate 12 so as to prevent the push-in cage 30 from rotating relative to the faceplate 12. The shape of the key 37 of the push-in cage 30 is complementary to the shape of the key 11 of the faceplate 12.

Figure 7:
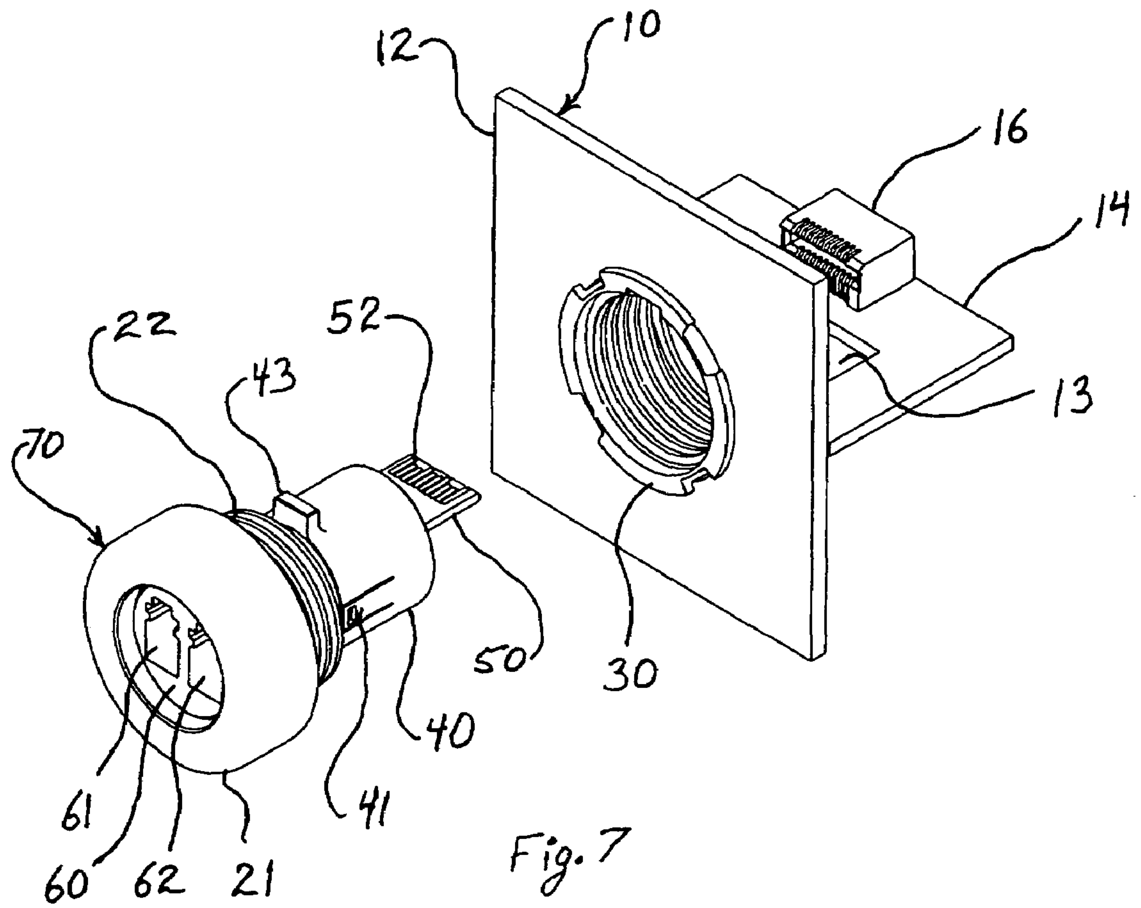
FIG. 7 is an exploded, perspective view of the push-in cage connected to the portion of the host structure, and the optoelectronic device of FIG. 1.

FIG. 7 is an exploded, perspective view of the optoelectronic device 70 of the device 20 disassembled from the push-in cage 30 of the device 20, where the push-in cage 30 is connected to the faceplate 12 of the host structure 10. The optoelectronic device 70 includes the nut 21, the optical connector 60, the housing 40, and the circuit board 50. The optical connector 60 includes a first receptacle 61, and a second receptacle 62. The first and second receptacles 61, 62 accept fiber optic connectors that conform to the LC industrial standard; however, the receptacles of the optical connector 60 can be designed to accommodate any type of design of connector including fiber optic connectors, electrical connectors, and hybrid fiber optic/electrical connectors. Additionally, FIG. 7 displays the first receptacle 61, and the second receptacle 62, however other embodiments of the invention can include a single receptacle, and alternative embodiments can include three or more receptacles. Thus, in the single receptacle embodiment, the device 20 could be either a transmitter or a receiver.

The nut 21 includes thread form 22. Thread form 22 of the nut 21 is complementary to thread form 35 of the push-in cage 30. The housing 40 includes key 43, and flexible arm 41, and flexible arm 42. The circuit board 50 includes electrical connector 52 mounted to or formed on the circuit board 50.

Figure 8:
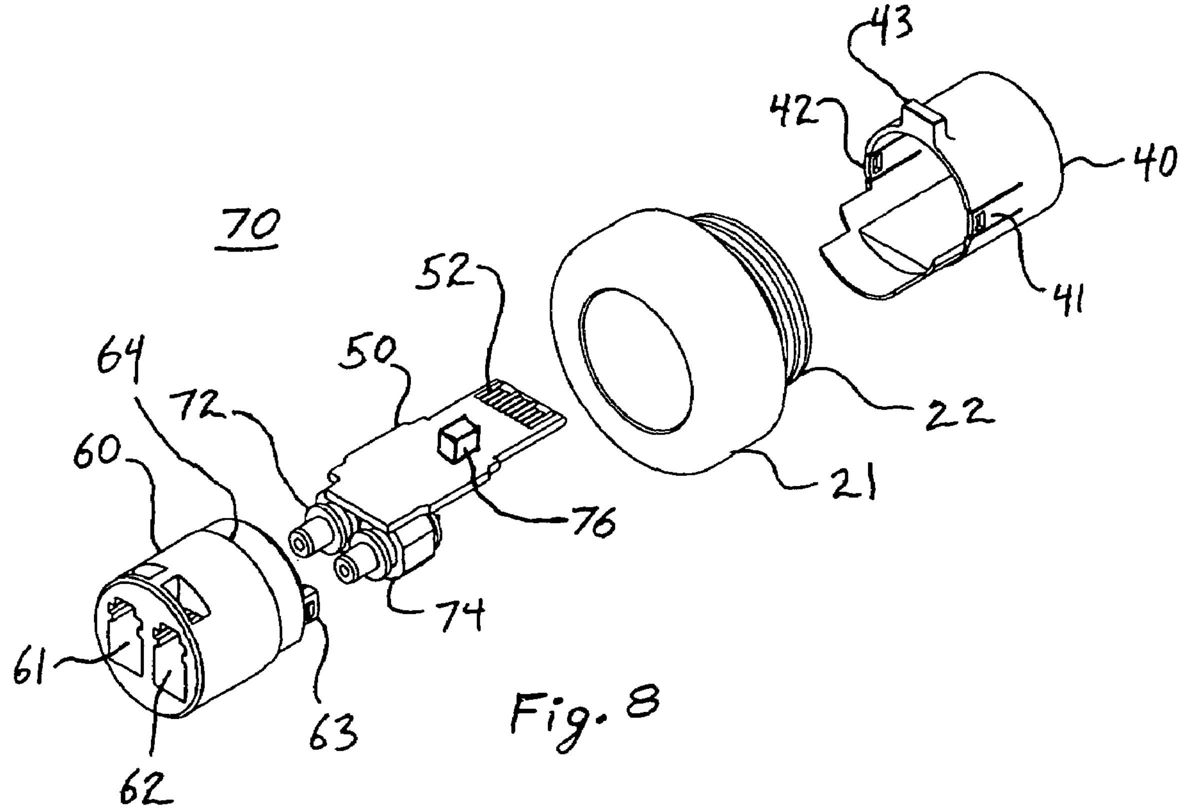
FIG. 8 is an exploded, perspective view of the optoelectronic device.

FIG. 8 is an exploded, perspective view of the optoelectronic device 70. The optical connector 60 further includes a first tab 63 and a second tab (not shown). Electrically associated with or connected to the circuit board 50 are a first optical subassembly 72, a second optical subassembly 74, and electrical signal conditioning components 76. The first optical subassembly 72 can be a transmitting optical subassembly or a receiving optical subassembly. The second optical subassembly 74 can be a transmitting optical subassembly or a receiving optical subassembly. For the optoelectronic device 70 to be a transceiver, the first optical subassembly 72 is a transmitting optical subassembly and the second optical subassembly 74 is a receiving optical subassembly, or the first optical subassembly 72 is a receiving optical subassembly and the second optical subassembly 74 is a transmitting optical subassembly. The optoelectronic device can also be a dual receiver where the first optical subassembly 72 is a receiving optical subassembly and the second optical subassembly 74 is a receiving optical subassembly. Or in the alternative, the optoelectronic device 70 can be a dual transmitter where the first optical subassembly 72 is a transmitting optical subassembly and the second optical subassembly 74 is a transmitting optical subassembly. Each of the first and second optical subassemblies 72, 74 are electrically associated with electrical signal conditioning components 76 mounted on the circuit board 50, and the electrical signal conditioning components 76 are electrically associated with the electrical connector 52 so as to electrically associate the electrical connector 52 with the first and second optical subassemblies 72, 74. The electrical signal conditioning components 76 can include electrical components such an integrated circuit chip, a resistor, a capacitor, an inductor, or any other devices such as an amplifier which would be electrically associated with a receiving optical subassembly, and a power controller which would be electrically associated with a transmitting optical subassembly.

During assembly, the first and second optical subassemblies 72, 74 are attached to the circuit board 50. Then part of the circuit board 50, and the first and second optical subassemblies 72, 74 are introduced into the optical connector 60. The respective ferrule receiving bores associated with the first and second optical subassemblies 72, 74 are in optical communication with the respective receptacles 61, 62 of the optical connector 60. The nut 21 is then introduced around the optical connector 60 and the circuit board 50. Next the housing 40 is introduced around the circuit board 50 and engages the optical connector 60. The housing 40 is urged toward the optical connector 60 so that the flexible arm 41 and the flexible arm 42 deflect away from one another when they first meet the first tab 63 and the second tab of the optical connector 60. Upon further urging, the first flexible arm 41 and the second flexible arm 42 become locked with the first tab 63 and the second tab, and the first and second flexible arms 41 42 return substantially to their un-deflected positions. In the locked position, the tab 63 enters an aperture present near the end of the flexible arm 41. The tab 63 is substantially rigid in comparison to the flexible arm 41. The un-numbered tab and the flexible arm 42 engage each other in a like manner as described above in regard to tab 63 and flexible arm 41. Once the housing 40 is locked to the optical connector 60, the circuit board 50 is retained between the housing 40 and the optical connector 60, and the nut 21 is retained between housing 40 and the optical connector 60, however, the nut is free to rotate relative to the housing 40, the optical connector 60, and the circuit board 50.

Figure 9:
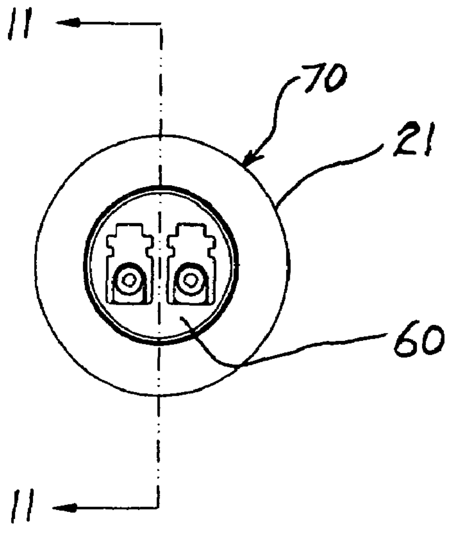
FIG. 9 is a front view of the optoelectronic device.
Figure 10:
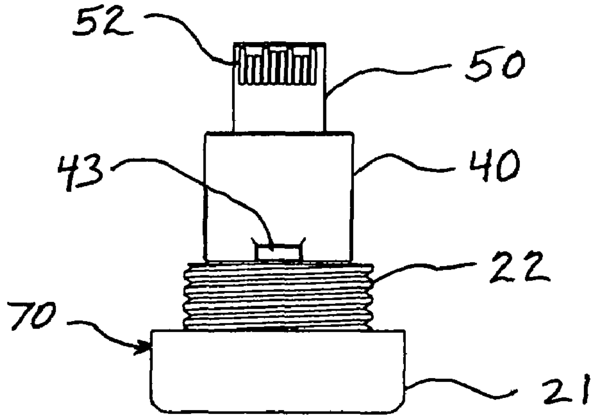
FIG. 10 is a top view of the optoelectronic device of FIG. 9.

FIG. 9 is a front view of the optoelectronic device 70 which shows the optical connector 60 and the nut 21. FIG. 10 is a top view of the optoelectronic device 70 which shows the nut 21, the housing 40, and the circuit board 50. Also shown are the thread form 22 of the nut 21, the key 43 of the housing 40, and the electrical connector 52 of the circuit board 50.

Figure 11:
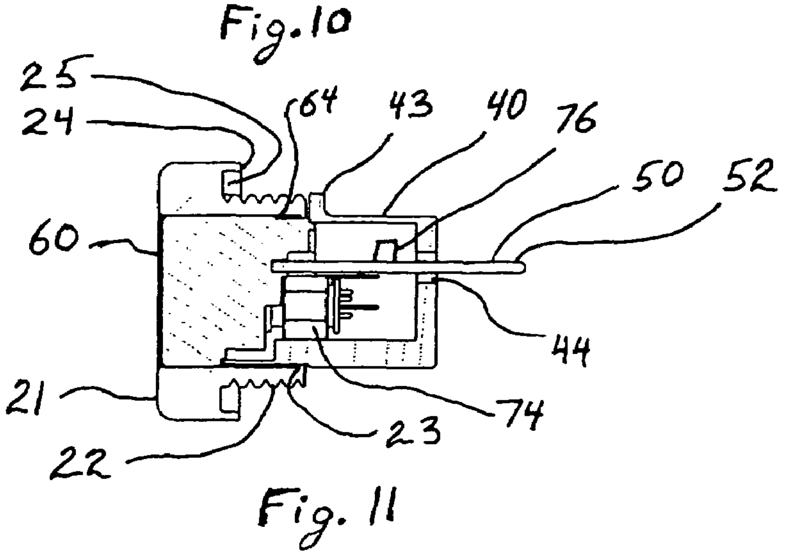
FIG. 11 is a cross-sectional side view of the optoelectronic device taken along section line 11-11 of FIG. 9.

FIG. 11 is a cross-sectional side view of the optoelectronic device 70 of the device 20 taken along section line 11-11 of FIG. 9. A lip 23 on the nut 21 is trapped between an edge 64 of the optical connector 60 and the key 43 of the housing 40 so as to limit the translational travel of the nut 21. However, the nut 21 is free to rotate. The portion of the circuit board 50 that accommodates the electrical connector 52 protrudes through an aperture 44 in the housing 40 so as to expose the electrical connector 52. The nut 21 also includes a contact surface 24, and a gap 25.

Figure 12:
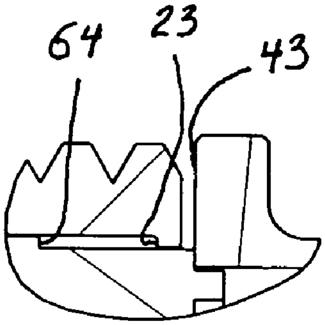
FIG. 12 is a partial, exploded, cross-sectional side view of the lip of the nut, the key of the housing, and the edge of the optical connector of FIG. 11.

FIG. 12 is a partial, exploded, cross-sectional side view which more clearly shows of the lip 23 of the nut 21, the key 43 of the housing 40, and the edge 64 of the optical connector 60 of FIG. 11. Thus, the nut 21 is retained between the housing 40 and the optical connector 60; however, the lip 23 of the nut 21 can translate between the edge 64 and the key 43.

Figure 13:
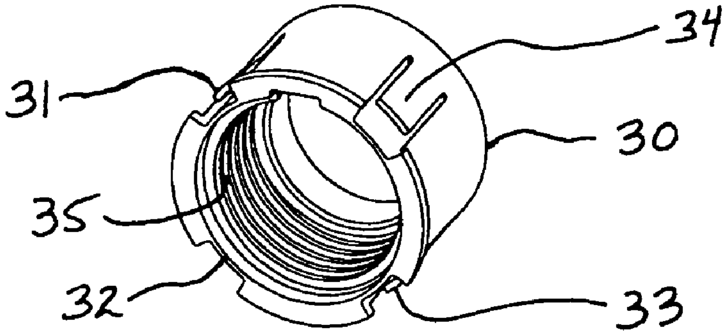
FIG. 13 is a perspective view of the push-in cage.
Figure 14:
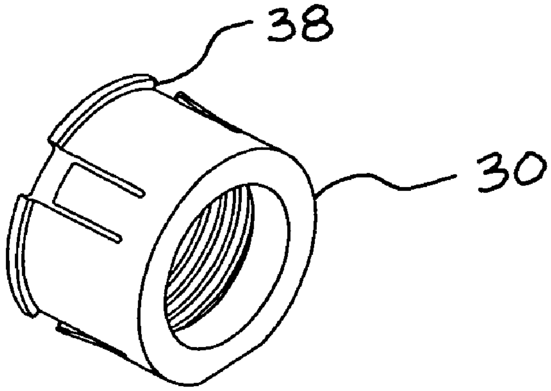
FIG. 14 is a perspective view of the push-in cage of FIG. 13 taken from another angle.
Figure 15:
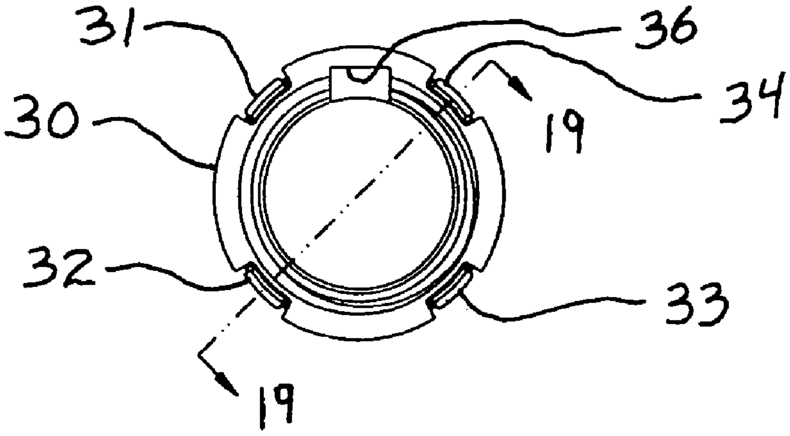
FIG. 15 is a front view of the push-in cage of FIG. 13.

FIG. 13 is a perspective view of the push-in cage 30. FIG. 14 is a perspective view of the push-in cage 30 taken from another angle. FIG. 15 is a front view of the push-in cage 30. The push-in cage 30 includes the first flexible tab 31, the second flexible tab 32, the third flexible tab 33, the fourth flexible tab 34, the thread form 35, and another or second key, key 36, in addition to key 37. Key 36 of the push-in cage 30 is complementary to the key 43 of the housing 40. When the key 43 of the housing 40 engages the key 36 of the push-in cage 30, the engagement of the keys 43, 36 prevents the housing 40, the optical connector 60, and the circuit board 50 from rotating relative to the push-in cage 30.

Figure 16:
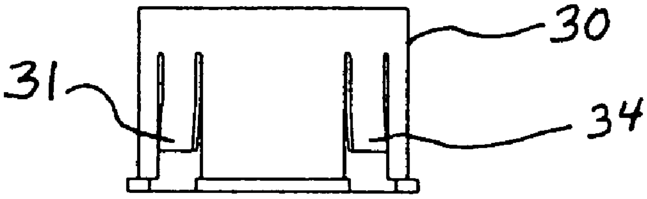
FIG. 16 is a top view of the push-in cage of FIG. 13.
Figure 17:
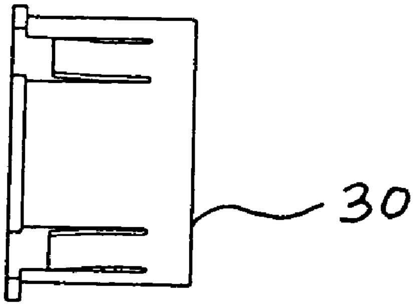
FIG. 17 is a side view of the push-in cage of FIG. 13.
Figure 18:
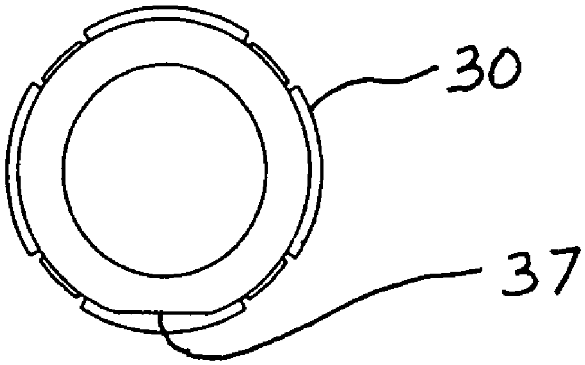
FIG. 18 is a back view of the push-in cage of FIG. 13.

FIG. 16 is a top view of the push-in cage 30. FIG. 17 is a side view of the push-in cage 30. FIG. 18 is a back view of the push-in cage 30. The key 37 of the push-in cage 30 is disclosed. Key 37 is complementary to the key 11 of the faceplate 12 of the host structure 10 so as to prevent rotation of the push-in cage 30 relative to the faceplate 12.

Figure 19:
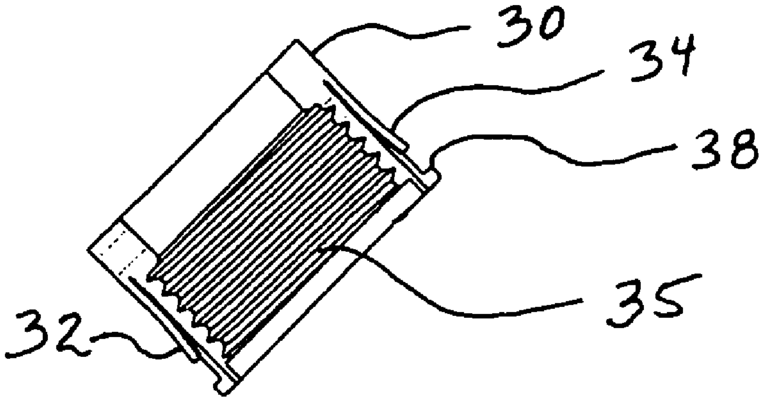
FIG. 19 is a cross-sectional side view of the push-in cage taken along section line 19-19 of FIG. 15.
Figure 20:
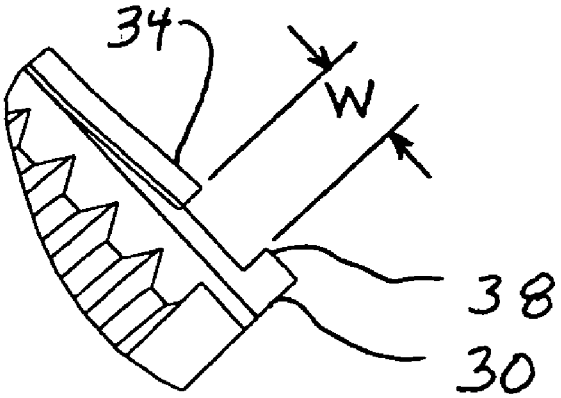
FIG. 20 is a partial, exploded, cross-sectional side view of the push-in cage of FIG. 19.

FIG. 19 is a cross-sectional side view of the push-in cage 30 taken along section line 19-19 of FIG. 15. Disclosed in more detail are the flexible arm 32, the flexible arm 34, a flange 38, and the thread form 35. FIG. 20 is a partial, exploded, cross-sectional side view of the push-in cage 30 of FIG. 19. Shown in more detail is the length of the width dimention between an end of the flexible tab 34 and an edge of the flange 38 which is denoted by the alphabetic character W.

The width dimension W between the end of the flexible tab 34 and the edge of the flange 38 is slightly greater than the thickness dimension X of the faceplate 12. When the push-in cage 30 is inserted, by the user, into the aperture 15 of the faceplate 12, the flexible tabs 31, 32, 33, 34 deflect until they pass by the thickness of the faceplate 12, at which time the flexible tabs 31, 32, 33, 34 return to their un-deflected positions. In the un-deflected position, the ends of the flexible tabs 31, 32, 33, 34 extend beyond the perimeter of the aperture 15 so that the push-in cage 30 can not readily be removed form the faceplate 12 since the faceplate 12 is trapped between the ends of the flexible tabs 31, 32, 33, 34 and the flange 38 of the push-in cage 30. However, before the push-in cage 30 can be inserted into the aperture 15, the key 37 of the push-in cage 30 must be aligned with the key 11 of the faceplate 12. Once installed, the edge of the flange 38 of the push-in cage 30 contacts a surface of the faceplate 12.

The assembled optoelectronic device 70 can then be engaged with the push-in cage 30. The electrical connector 52 and the housing 40 of the optoelectronic device are introduced into the push-in cage 30, by the user, so as to engage the electrical connector 52 with the electrical connector 16 of the host structure 10. The key 43 of the housing 40 is engaged with the key 36 of the push-in sleeve 30, and the thread form 22 of the nut 21 is engaged with the thread form 35 of the push-in cage 30. As the nut 21 is rotated, the nut 21 translates closer to the faceplate 12 of the host structure 10. As the nut 21 translates, the nut 21 contacts key 43 of the housing 40 thus causing the housing 40, the optical connector 60, and the circuit board 50 to translate substantially an equal amount. As the user continues to rotate the nut 21, the electrical connector 52 engages and makes electrical contact with electrical connector 16 of the host structure 10.

The optoelectronic device 70 is fully locked to the push-in cage 30 when, upon further rotation of the nut 21 by the user, the nut 21 pulls the push-in cage 30 towards the nut 21, and a portion of the faceplate 12 becomes clamped between a contact surface 24 of the nut 21 and the ends of the flexible tabs 31, 32, 33, 34 of the push-in cage 30. The gap 25 of the nut 21 is large enough to accommodate the flange 38 of the push-in cage 30, so that when the nut 21 is in the locked position, the nut 21 fully encompasses the push-in cage 30 on the one side of the faceplate 12 which the nut 21 contacts.

The nut 21, the push-in cage 30, the housing 40, the optical connector 60, are made of a metallic material. Thus, once the device 20 (optoelectronic device 70 and push-in cage 30) is mounted to the host structure 10, the device 20 substantially prevents the leakage of EMI out of the aperture 15 of the host structure 10.

As compared to previous devices, the use of the present device 20 reduces the amount of work required to be performed on the circuit board 14 of the host structure 10. To accommodate the device 20, work to be performed on the circuit board 14 includes the mounting of the electrical connector 16 and the cutting out of the cut-out 13. The cut-out 13 provides clearance for the push-in cage 30, and the housing 40. A cage is not mounted or soldered to the circuit board 14 since the push-in cage 30 is mounted to the faceplate 12 by the hand of the user.

The cut-out 13 can be sized so that the housing 40 contacts an edge of the circuit board 14, thus providing a hard stop, so as to prevent the electrical connector 52 from bottoming out in the electrical connector 16 and causing damage to the electrical connector 16 of the host structure 10.

It is envisioned that the device can take the form of other embodiments, such as an optical connector 60 that utilizes only one receptacle, or a nut 21 that has a knurled contact surface 24 that contacts the faceplate 12 to further reduce EMI emissions, or the inclusion of a kick-out spring on the housing 40 of the device 20 which pushes against the cut-out 13 in the host structure 10 to reduce play or backlash in the device 20 once it is installed.

It is further envisioned that the push-in cage could take the form of a two piece assembly, where one piece consists of a threaded cage and the second piece consists of a sheet metal cover that snaps over the threaded cage. The second piece, the sheet metal cover, would contain the locking and retaining flange and features.

It is still further envisioned that instead of a threaded nut, the optoelectronic device can be attached to the push-in cage with a bayonet style mount instead of a thread form, or a peg-in-slot design could be used instead of the thread form. Additionally, other embodiments could have the bayonet style mount attached to the optoelectronic side of the device and other embodiments can have the bayonet style mount attached to the push-in cage side of the device.

In other embodiments it is envisioned that the optoelectronic device 70 is replaced with a non-optoelectronic device, where such a device can be called an electronic device and may have electronics similar to an electronic GBIC. And, in another embodiment, the electrical connectors could be BNC connectors.

Obviously, numerous modifications and variations of the present invention are possible in light of the above teachings. It is therefore to be understood that within the scope of appended claims, the invention may be practiced otherwise than as specifically described herein.

The invention claimed is:

1. A device comprising:

a push-in cage having a first thread form, and a first key; and an optoelectronic device having an optical subassembly, electrical signal conditioning components electrically associated with the optical subassembly, a second thread form, and a second key, and wherein the second thread form of the optoelectronic device is complementary to the first thread form of the push-in cage, and wherein the second key of the optoelectronic device is complementary to the first key of the push-in cage.

2. A device according to claim 1 wherein the optical subassembly is a transmitting optical subassembly.

3. A device according to claim 1 wherein the optical subassembly is a receiving optical subassembly.

4. A device according to claim 1, further comprising a second optical subassembly.

5. A device according to claim 4 wherein the optical subassembly is a transmitting optical subassembly, and the second optical subassembly is a transmitting optical subassembly.

6. A device according to claim 4 wherein the optical subassembly is a transmitting optical subassembly, and the second optical subassembly is a receiving optical subassembly.

7. A device according to claim 4 wherein the optical subassembly is a receiving optical subassembly, and the second optical subassembly is a receiving optical subassembly.

8. A device mateable with a host structure, where the host structure includes a faceplate, an electrical connector, and a key, the device comprising:

a push-in cage having a first thread form, a first key, and a second key, the push-in cage adapted for attachment to the faceplate of the host structure, and wherein the first key of the push-in cage is complementary to the key of the host structure;

a circuit board;

an optical subassembly electrically associated with the circuit board;

an optical connector having a receptacle for receiving a fiber optic connector, and wherein the optical subassembly is in optical communication with the receptacle;

an electrical connector on the circuit board;

a housing mounted to the optical connector, the housing having a third key, and wherein the third key of the housing is complementary to the second key of the push-in cage; and a nut retained between the housing and the optical connector, the nut having a second thread form, and wherein the nut is free to rotate relative to the housing and the optical connector, and wherein the second thread form of the nut is complementary to the first thread form of the push-in cage, and wherein, when the push-in cage is mounted to the faceplate of the host structure, the key of the host structure engages the first key of the push-in cage so as to prevent the push-in cage from rotating relative to the faceplate of the host structure, and wherein, when the second thread form of the nut is engaged with the first thread form of the push-in cage, the third key of the housing engages the second key of the push-in cage so as to prevent the housing from rotating relative to the push-in cage, and wherein, when the nut is rotated relative to the push-in cage, the nut translates closer to the faceplate of the host structure so as to cause the optical connector, circuit board, and housing to translate by substantially the same amount, and wherein, upon further rotation of the nut relative to the push-in cage, the electrical connector on the circuit board electrically engages the electrical connector of the host structure.

9. A device according to claim 8 wherein the circuit board includes electrical signal conditioning components.

10. A device according to claim 9 wherein the optical subassembly is a transmitting optical subassembly.

11. A device according to claim 9 wherein the optical subassembly is a receiving optical subassembly.

12. A device according to claim 9, further comprising a second optical subassembly electrically associated with the circuit board.

13. A device according to claim 12 wherein the optical subassembly is a transmitting optical subassembly, and the second optical subassembly is a receiving optical subassembly.

14. A device according to claim 12 wherein the optical subassembly is a transmitting optical subassembly, and the second optical subassembly is a transmitting optical subassembly.

15. A device according to claim 12 wherein the optical subassembly is a receiving optical subassembly, and the second optical subassembly is a receiving optical subassembly.

16. A device according to claim 9 wherein the receptacle of the optical connector accommodates and is complementary to a fiber optic connector that conforms to the LC standard fiber optic connector.

17. A device mateable with a host structure, where the host structure includes a faceplate, an electrical connector, and a key, the device comprising:

a push-in cage having a first thread form, a first key, and a second key, the push-in cage adapted for attachment to the faceplate of the host structure, and wherein the first key of the push-in cage is complementary to the key of the host structure;

a circuit board having electrical signal conditioning components;

a first optical subassembly electrically associated with the circuit board;

a second optical subassembly electrically associated with the circuit board;

an optical connector having a first receptacle for receiving a first fiber optic connector, and a second receptacle for receiving a second fiber optic connector, and wherein the first optical subassembly is in optical communication with the first receptacle, and the second optical subassembly is in optical communication with the second receptacle;

an electrical connector on the circuit board;

a housing mounted to the optical connector, the housing having a third key, and wherein the third key of the housing is complementary to the second key of the push-in cage; and a nut retained between the housing and the optical connector, the nut having a second thread form, and wherein the nut is free to rotate relative to the housing and the optical connector, and wherein the second thread form of the nut is complementary to the first thread form of the push-in cage.

18. A device according to claim 17 wherein the first optical subassembly is a transmitting optical subassembly.

19. A device according to claim 18 wherein the second optical subassembly is a receiving optical subassembly.

20. A device according to claim 18 wherein the second optical subassembly is a transmitting optical subassembly.

21. A device mateable with a host structure, where the host structure includes a faceplate, an electrical connector, and a key, the device comprising:

a push-in cage having a first key, and a second key, the push-in cage adapted for attachment to only the faceplate of the host structure, and wherein the first key of the push-in cage is complementary to the key of the host structure; and an optoelectronic device having an optical subassembly, electrical signal conditioning components electrically associated with the optical subassembly, and a third key, and wherein the third key of the optoelectronic device is complementary to the second key of the push-in cage.

22. A device mateable with a host structure, where the host structure includes a faceplate, an electrical connector, and a key, the device comprising:

a push-in cage having a first thread form, a first key, and a second key, the push-in cage adapted for attachment to the faceplate of the host structure, and wherein the first key of the push-in cage is complementary to the key of the host structure; and an electronic device having a second thread form, a third key, and wherein the third key of the electronic device is complementary to the second key of the push-in cage, and wherein the second thread form of the electronic device is complementary to the first thread form of the push-in cage.

* * * * *